US009857852B2

(12) United States Patent
Shirokaze

(10) Patent No.: US 9,857,852 B2
(45) Date of Patent: Jan. 2, 2018

(54) MANAGEMENT CONTROL SYSTEM, SERVER SYSTEM, MANAGEMENT CONTROL METHOD, AND PROGRAM RECORDING MEDIUM

(71) Applicant: NEC Corporation, Tokyo (JP)

(72) Inventor: Takayuki Shirokaze, Tokyo (JP)

(73) Assignee: NEC CORPORATION, Tokyo (JP)

( * ) Notice: Subject to any disclaimer, the term of this patent is extended or adjusted under 35 U.S.C. 154(b) by 664 days.

(21) Appl. No.: 14/484,310

(22) Filed: Sep. 12, 2014

(65) Prior Publication Data
US 2015/0081132 A1 Mar. 19, 2015

(30) Foreign Application Priority Data

Sep. 13, 2013 (JP) .................................. 2013-190150

(51) Int. Cl.
G11B 5/596 (2006.01)
G06F 1/20 (2006.01)
G06F 11/00 (2006.01)
G06F 11/30 (2006.01)

(52) U.S. Cl.
CPC ............ *G06F 1/206* (2013.01); *G06F 11/004* (2013.01); *G06F 11/3034* (2013.01); *G06F 11/3058* (2013.01)

(58) Field of Classification Search
None
See application file for complete search history.

(56) References Cited

U.S. PATENT DOCUMENTS 7,761,244 B2* 7/2010 Gross ..................... G11B 33/08
360/25
7,920,974 B2* 4/2011 Bougaev ................. G01M 7/00
702/56

(Continued)

FOREIGN PATENT DOCUMENTS

JP 2004-039140 2/2004
JP 2011-066522 3/2011

(Continued)

OTHER PUBLICATIONS

Japanese Office Action dated Jul. 1, 2014; Application No. 2013-190150.

*Primary Examiner* — K. Wong
(74) *Attorney, Agent, or Firm* — Young & Thompson

(57) ABSTRACT

Provided is a management control system for controlling the number of fan revolutions to avoid the number of fan revolutions likely to cause a high frequency of errors in a drive. The management control system includes: an error frequency calculating section for calculating a frequency of errors by acquiring the number of errors occurring in a drive and the number of fan revolutions, and then calculating the number of fan revolutions to avoid based on the frequency of errors; a storage section for storing the number of revolutions to avoid; and a fan revolution number controlling section for acquiring the number of fan revolutions and current ambient temperature in a housing, and controlling the number of fan revolutions within a revolution number range not including the number of revolutions to avoid stored in the storage section, depending on the ambient temperature.

10 Claims, 12 Drawing Sheets

(56) References Cited

U.S. PATENT DOCUMENTS

| | | | |
|---|---|---|---|
| 8,504,209 B2* | 8/2013 | Gross | G01N 29/12 324/166 |
| 9,036,291 B1* | 5/2015 | Nava | G11B 5/59694 360/69 |
| 2009/0067080 A1 | 3/2009 | Gross et al. | |
| 2009/0195922 A1* | 8/2009 | Urmanov | G11B 25/043 360/97.19 |

FOREIGN PATENT DOCUMENTS

| | | |
|---|---|---|
| JP | 2011-165241 | 8/2011 |
| JP | 2011-170518 | 9/2011 |
| JP | 2012-048653 | 3/2012 |
| JP | 2012-059312 | 3/2012 |

* cited by examiner

MANAGEMENT CONTROL SYSTEM, SERVER SYSTEM, MANAGEMENT CONTROL METHOD, AND PROGRAM RECORDING MEDIUM

This application is based upon and claims the benefit of priority from Japanese Patent Application No. 2013-190150, filed on Sep. 13, 2013, the disclosure of which is incorporated herein in its entirety by reference.

TECHNICAL FIELD

The present invention relates to a management control system, a server system, a management control method, and a program recording medium. In particular, the present invention relates to a management control system, a server system, a management control method, and a program recording medium recording a management control program which can prevent resonance between a drive and a fan provided in a server and thereby suppress occurrence of an error in the drive.

BACKGROUND ART

Along with recent increase in server density, attempts have been made to increase performance and capacity of such a server by arranging as many components as possible, such as a central processing unit (CPU), a memory, and a hard disk drive (HDD), in a limited space.

Meanwhile, due to the increase in server density, efficient transfer of heat generated by a CPU and a HDD becomes difficult. Recent servers are generally provided with fans for cooling heat-generating components in addition to components such as a CPU, a memory, and a HDD. This has led to demand for effective arrangement of fans in a server to efficiently cool heat sources such as a CPU and a HDD.

In addition, the increase in server density has raised necessity to densely arrange both a fan, which is a source of generating vibration, and a drive such as a HDD. This increases resonance between the drive and the fan, and may consequently increase a rate of errors occurring in the drive, which is sensitive to vibration.

Patent Document 1 (Japanese Unexamined Patent Application Publication No. 2004-39140) discloses an optical disk device which prevents an optical disk from resonating with vibration generated by a fan. The optical disk device of Patent Document 1 includes control means for controlling the number of fan revolutions so that a value equal to an integral multiple of a fundamental frequency corresponding to the number of fan revolutions would not coincide with a natural frequency of the optical disk.

A high-density server has a possibility that errors occur frequently in a HDD due to resonance between vibration generated by a fan and the HDD sensitive to vibration. Such errors may cause a breakdown of the HDD, which may further cause a system failure at worst. It is desirable that resonance between a fan and a HDD be suppressed while a server is in operation. However, in practice, a hardware (HW) configuration, the number of revolutions of each on-board HDD, and the like are different from one server to another, and hence resonance points vary. For this reason, a general high-density server has a problem that it is difficult to take precise measures to suppress HDD failures caused by resonance between a fan and a HDD.

According to the optical disk device of Patent Document 1, a frequency of vibration generated by a fan does not coincide with a natural frequency of an optical disk, which prevents resonance of the optical disk. However, this optical disk device has a problem of not being capable of corresponding to resonance related to the entire optical disk device, varying accompanying with changes with aging of housing and the like.

The present invention aims to provide a management control system for controlling the number of fan revolutions so as to avoid the number of fan revolutions likely to cause a high frequency of errors in a drive, by actually measuring the numbers of fan revolutions causing a high frequency of errors in the drive, to be stored in a database, and using information stored in the database.

SUMMARY

A management control system according to the present invention includes: error frequency calculating unit which acquires the number of errors occurring in a drive in association with the number of fan revolutions, calculating a frequency of errors by using the number of errors corresponding to the number of fan revolutions, and then calculating the number of revolutions to avoid, which is the number of fan revolutions to avoid, based on the calculated frequency of errors; storage unit which stores the number of revolutions to avoid; and fan revolution number controlling unit which acquires temperature of the drive or around the drive in association with the number of fan revolutions, and controlling the number of fan revolutions within a revolution number range not including the number of revolutions to avoid stored in the storage unit, according to the temperature of the drive or around the drive.

A management control method according to the present invention is a management control method for managing and controlling a drive and a fan. The management control method includes: acquiring the number of errors occurring in the drive in association with the number of fan revolutions, calculating a frequency of errors by using the number of errors corresponding to the number of fan revolutions, and calculating the number of revolutions to avoid, which is the number of fan revolutions to avoid, based on the calculated frequency of errors; storing the number of revolutions to avoid in a database; and then acquiring temperature of the drive or around the drive in association with the number of fan revolutions, and controlling the number of fan revolutions within a revolution number range not including the stored number of revolutions to avoid, according to the temperature of the drive or around the drive.

A program recording medium according to the present invention is a program recording medium for recording a management control program for managing and controlling a drive and a fan. The management control program causes a computer to execute: a processing of acquiring the number of errors occurring in the drive in association with the number of fan revolutions, calculating a frequency of errors by using the number of errors corresponding to the number of fan revolutions, and then calculating the number of revolutions to avoid, which is the number of fan revolutions to avoid, based on the calculated frequency of errors; a processing of storing the number of revolutions to avoid in a database; and a processing of acquiring temperature of the drive or around the drive in association with the number of fan revolutions, and controlling the number of fan revolutions within a revolution number range not including the stored number of revolutions to avoid, according to the temperature of the drive or around the drive.

BRIEF DESCRIPTION OF THE DRAWINGS

Exemplary features and advantages of the present invention will become apparent from the following detailed description when taken with the accompanying drawings in which.

EXEMPLARY EMBODIMENT

An embodiment of the present invention will be described below with reference to the drawings. However, note that, although the embodiment to be described below includes limitations technically preferable in implementing the present invention, the scope of the invention is not limited thereto.

Embodiment

Figure 1:
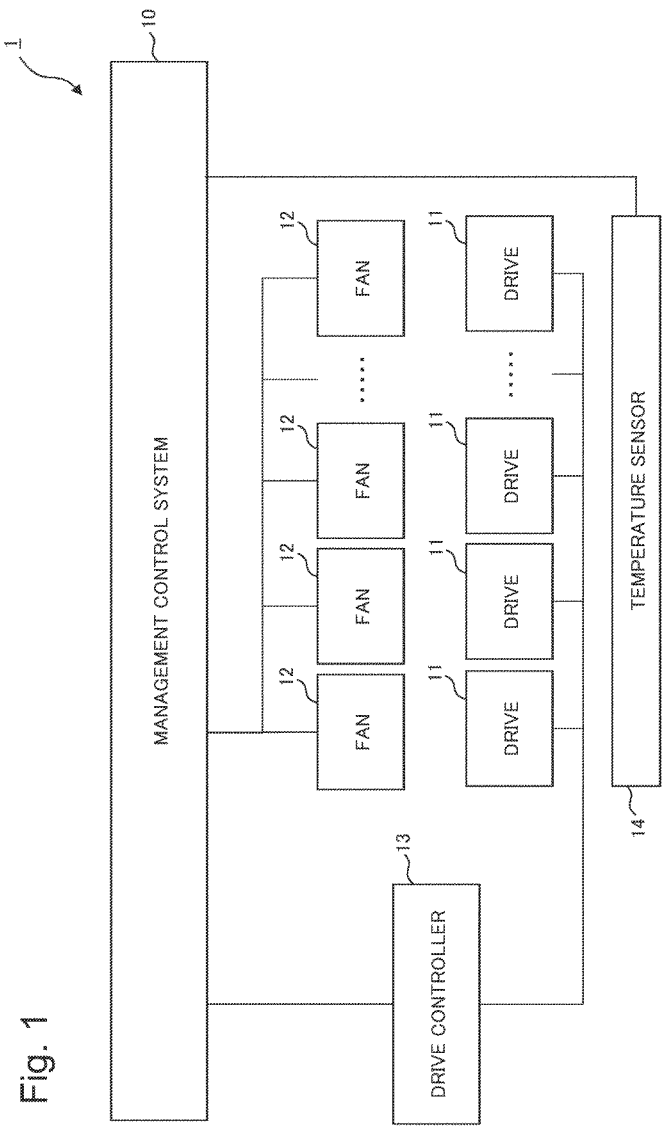
FIG. 1 is a functional block diagram of a server system according to an embodiment of the present invention.

FIG. 1 is a functional block diagram of a server system 1 including a management control system 10 according to the embodiment of the present invention.

The server system 1 according to the embodiment of the present invention includes a management control system 10, at least one drive 11, at least one fan 12, a drive controller 13, and a temperature sensor 14. The server system 1 includes features to be described below in the embodiment, in addition to functions as a general server (including a storage).

(Management Control System)

The management control system 10 acquires information on the drive 11. In addition, the management control system 10 outputs, to the fan 12, a fan control signal for controlling driving of the fan 12 based on the acquired information. The management control system 10 may be implemented as an information processor such as a computer including a central processing unit (CPU), a memory, an input/output device, and an auxiliary storage, for example. Alternatively, the management control system 10 may be implemented as a program to be executed by a server device including a CPU, a memory, an input/output device, and an auxiliary storage, for example.

The management control system 10 can periodically acquire the number of revolutions of the fan 12 and drive information on the drive 11, such as a hard disk drive (HDD), via a bus or the like.

For example, when the drive 11 is an HDD, self-monitoring, analysis and reporting technology (S.M.A.R.T.) information corresponds to the drive information. For example, when the management control system 10 is configured as a service processor, the management control system 10 is connected to the fan 12 via a bus called an inter-integrated circuit (12C), or the like.

The management control system 10 can individually control a plurality of drives 11 and a plurality of fans 12 included in the server system 1. In the following, it is assumed that a plurality of drives 11 and a plurality of fans 12 are included when the numbers thereof are not specified.

(Drive)

The drive 11 is an external storage included in the server system 1, and is, for example, a magnetic disk drive such as an HDD, or an optical disk drive such as a compact disc (CD) and a digital versatile disc (DVD). The drive 11 is driven at a specific number of revolutions, and has a possibility of resonating with a physical device including a body of revolution such as the fan 12.

When the drive 11 is an HDD, the S.M.A.R.T. function is generally included inside the HDD. The S.M.A.R.T. function aims to detect a HDD fault in an early stage and anticipate a breakdown of the HDD, and includes a plurality of inspection items. Specifically, in the management control system 10 according to the present embodiment, inspection items such as Seek Error Rate, Vibration During Write, and Vibration During Read, are monitored. However, in the management control system 10, other inspection items included in S.M.A.R.T. may be monitored.

(Fan)

The fan 12 is an air blower for cooling a heat-generating electronic component such as the drive 11, and atmosphere around the electronic component. The fan 12 blows air by revolving blades or the like, and hence has a possibility of resonating with a device such as the drive 11 driven at a specific number of revolutions.

As the fan 12, a fan such as a centrifugal fan, an axial fan, a diagonal fan, and a transverse fan may be used, for example. Note that the fan 12 is not limited to the above described types, and may be a fan of a type different from the above types. In addition, the fan 12 itself may include a cooling device.

The drive controller 13 drives the drive 11, and also provides information on the drive 11 to the management control system 10.

When the drive 11 is an HDD, the drive controller 13 may be implemented by redundant arrays of inexpensive disks (or redundant arrays of independent disks) (RAID) controller, for example. When the drive 11 is an HDD, the drive controller 13 acquires S.M.A.R.T. information of the HDD, and outputs the acquired S.M.A.R.T. information to the management control system 10.

In addition, it is preferable that the server system 1 according to the present embodiment include the temperature sensor 14 for acquiring ambient temperature around a heat-generating electronic component such as the drives 11. However, the temperature sensor 14 does not need to be included in the server system 1 as long as temperature information of atmosphere to be measured can be acquired by some means. Alternatively, the temperature sensor 14 may be configured to acquire temperature of an electronic component itself. In the following description, the temperature of an electronic component and the temperature around the electronic component are expressed as ambient temperature.

The temperature sensor 14 is provided so as to be capable of measuring temperature of a position where temperature is adjusted by air blowing by the fan 12 controlled by the management control system 10. Only one temperature sensor 14 may be provided as in FIG. 1, or a plurality of temperature sensors 14 may be provided so as to correspond to the respective drives 11. The temperature sensor 14 outputs temperature information of the specific measured position to the management control system 10.

The temperature sensor 14 needs to be disposed so as to acquire ambient temperature around a single or a plurality of drives 11, for example, and may be disposed so as to acquire ambient temperature inside the server system 1 including all the drives 11.

The temperature sensor 14 may be a sensor, such as a thermocouple temperature sensor or a resistance temperature sensor, which is to be disposed directly in an environment to be measured, or may be a sensor, such as an infrared sensor, which is to be disposed at a position distant from a position to be measured. For example, when the temperature sensor 14 is capable of acquiring two-dimensional temperature distribution information, the management control system 10 may be configured to individually control a plurality of fans 12 based on the two-dimensional temperature distribution information. When the temperature sensor 14 is capable of acquiring two-dimensional temperature distribution information, the plurality of fans 12 can efficiently cool cooling-target positions, based on the two-dimensional temperature distribution information acquired by the single temperature sensor 14.

Next, a specific configuration of the management control system according to the present embodiment will be described in detail.

Figure 2:
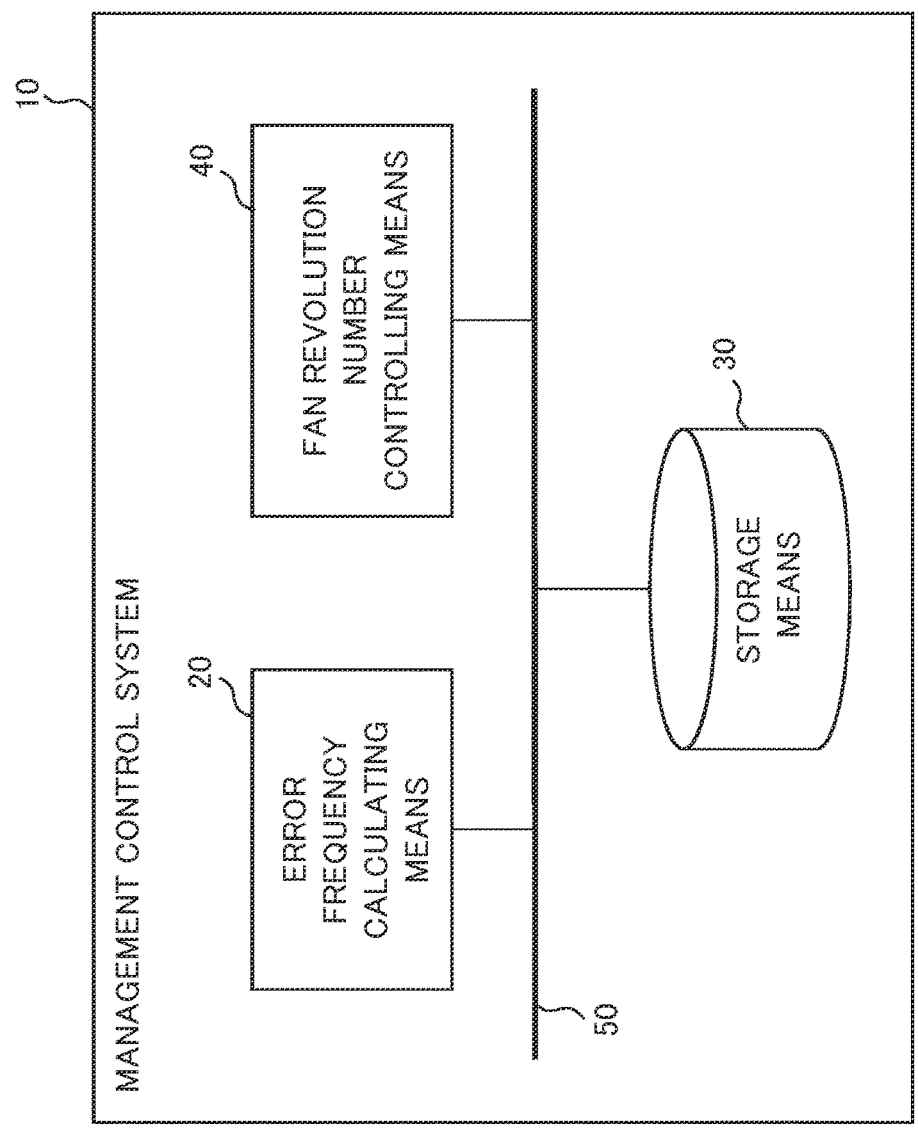
FIG. 2 is a functional block diagram of a management control system according to the embodiment of the present invention.

As illustrated in FIG. 2, the management control system 10 includes error frequency calculating means 20, storage means 30, and fan revolution number controlling means 40.

The storage means 30 is a storage included in the server system 1. The storage means 30 is implemented by a storage such as a memory or an auxiliary storage such as an HDD, and configures a database.

(Error Frequency Calculating Means)

Figure 3:
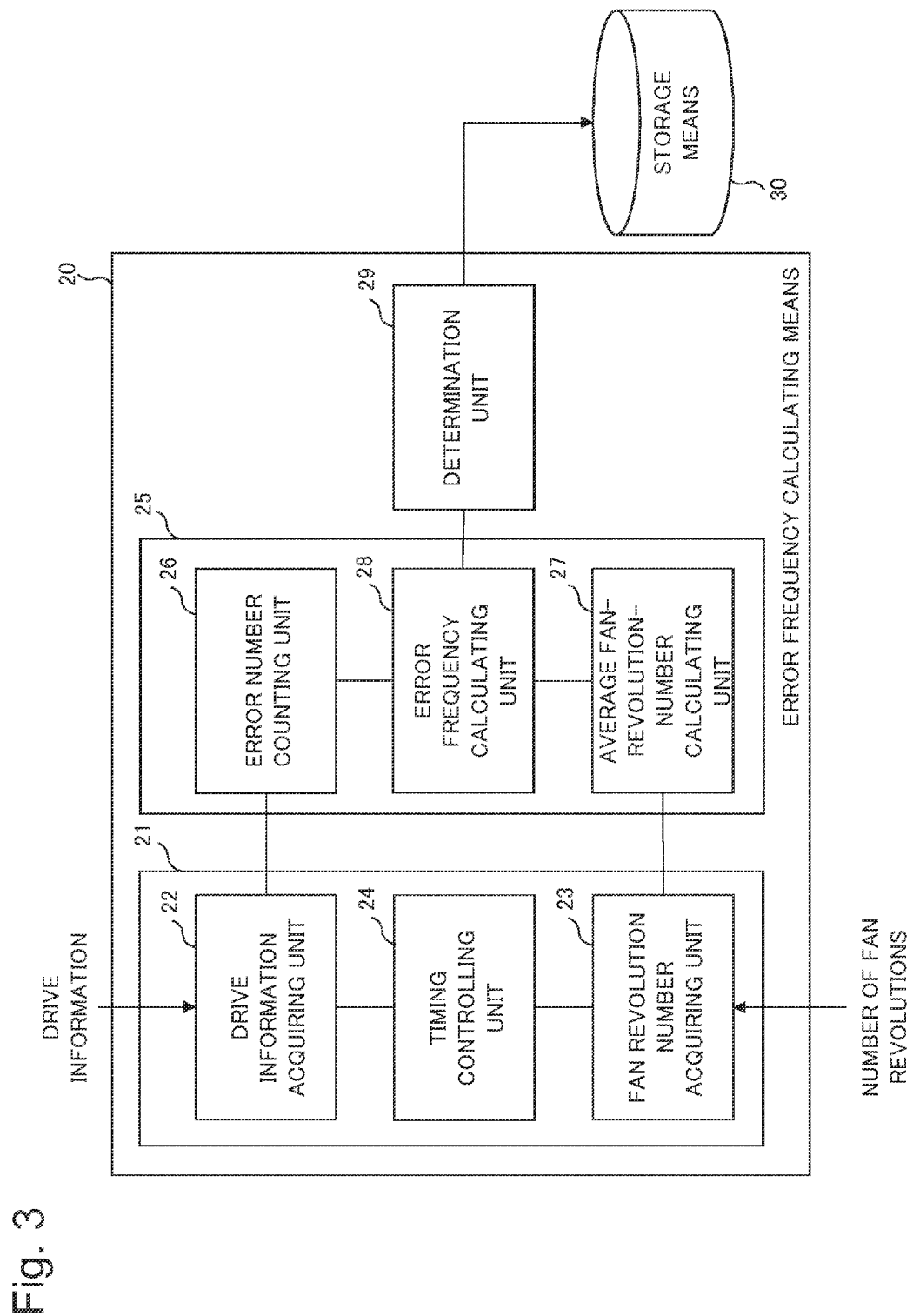
FIG. 3 is a functional block diagram of error frequency calculating means of the management control system according to the embodiment of the present invention.

As illustrated in FIG. 3, the error frequency calculating means 20 includes a revolution-number/drive-information acquiring unit 21, a calculation unit 25, and a determination unit 29. The revolution-number/drive-information acquiring unit 21 includes a drive information acquiring unit 22, a fan revolution number acquiring unit 23, and a timing controlling unit 24, as illustrated in FIG. 3. The calculation unit 25 includes an error number counting unit 26, an average fan-revolution-number calculating unit 27, and error frequency calculating unit 28, as illustrated in FIG. 3. The error frequency calculating means 20 records the number of fan revolutions causing a high frequency of errors. In the following, the "number of fan revolutions" is sometimes simply referred to as the "number of revolutions."

The revolution-number/drive-information acquiring unit 21 is revolution-number/drive-information acquiring means for acquiring drive information of the drive 11 and acquiring fan revolution number information (the current number of revolutions) of the fan 12.

The drive information acquiring unit 22 and the fan revolution number acquiring unit 23 include an input/output function for inputting/outputting data and a communication function, for example, and transmit and receive data at timing specified by the timing controlling unit 24. The timing controlling unit 24 itself may include an oscillator circuit, for example, to control timing of data input/output by using the oscillator circuit, or may control data input/output at predetermined timing by using a clock acquired from an external device.

The drive information acquiring unit 22 acquires current drive information of the drive 11. When the drive 11 is an HDD, the drive information acquiring unit 22 acquires any of the inspection items included in the S.M.A.R.T. information, as drive information. The drive information acquiring unit 22 mainly acquires drive information related to error occurrence, as S.M.A.R.T. information.

The drive information acquiring unit 22 outputs information related to frequency of errors from the acquired drive information, to the error number counting unit 26.

The fan revolution number acquiring unit 23 acquires the current number of fan revolutions (the current number of revolutions) of the fan 12. The fan revolution number acquiring unit 23 outputs the acquired number of fan revolutions to the average fan-revolution-number calculating unit 27.

The timing controlling unit 24 controls timing of information acquisition by the drive information acquiring unit 22 and the fan revolution number acquiring unit 23. The timing controlling unit 24 controls the drive information acquiring unit 22 and the fan revolution number acquiring unit 23 so as to periodically acquire drive information and fan revolution number information in a specific polling period.

The timing controlling unit 24 may synchronize the timing of information acquisition by the drive information acquiring unit 22 and the fan revolution number acquiring unit 23, or may control the drive information acquiring unit 22 and the fan revolution number acquiring unit 23 to acquire information at respective acquisition times set individually. It is preferable that the timing controlling unit 24 manages time information at the time of information acquisition by the drive information acquiring unit 22 and the fan revolution number acquiring unit 23, so as to enable the error frequency calculating unit 28 to obtain correspondence relationship between the number of fan revolutions and a frequency of errors.

The calculation unit 25 is calculation means for calculating an average number of fan revolutions (also referred to as an average number of revolutions) of the fan 12 and counting the number of errors occurring in the drive 11, in the polling period. Then, the calculation unit 25 calculates a frequency of errors indicating the number of errors occurring per unit time at a certain number of fan revolutions (an average number of fan revolutions). The calculation unit 25 is implemented by a device including an arithmetic function such as a CPU, for example.

The error number counting unit 26 accumulates the number of errors in a specific polling period by using the drive information acquired from the drive information acquiring unit 22. The error number counting unit 26 outputs the number of errors thus accumulated, to the error frequency calculating unit 28.

The average fan-revolution-number calculating unit 27 calculates an average number of fan revolutions in a specific polling period by using the number of revolutions of the fan 12 acquired from the fan revolution number acquiring unit 23. The average number of fan revolutions is obtained by dividing the total of the numbers of fan revolutions by the time of polling. The average fan-revolution-number calculating unit 27 outputs the calculated average number of fan revolutions to the error frequency calculating unit 28.

The error frequency calculating unit 28 calculates a frequency of errors indicating the number of errors per unit time at a certain number of fan revolutions, by associating the number of errors acquired from the error number counting unit 26 with the average number of fan revolutions acquired from the average fan-revolution-number calculating unit 27. Specifically, the error frequency calculating unit 28 calculates a frequency of errors indicating the "number of errors occurring per unit time at the number of fan revolutions" so that the number of errors and the average number of fan revolutions in the polling period would be correlated.

The error frequency calculating unit 28 outputs a "pair of the number of fan revolutions and the frequency of errors" to the determination unit 29.

The determination unit 29 is determination means for acquiring a "pair of the number of fan revolutions and the frequency of errors" from the error frequency calculating unit 28. When the frequency of errors included in the acquired "pair of the number of fan revolutions and the frequency of errors" exceeds an arbitrary threshold value, the determination unit 29 stores the number of fan revolutions paired with the frequency of errors exceeding the arbitrary threshold value, as the number of revolutions to avoid, in the storage means 30. In other words, the determination unit 29 stores, in the storage means 30, the number of revolutions to avoid indicating the frequency of errors which may cause a fault in the drive 11, to thereby create a database. The determination unit 29 is implemented, for example, by using a part of functions of the CPU or the like.

Figure 4:
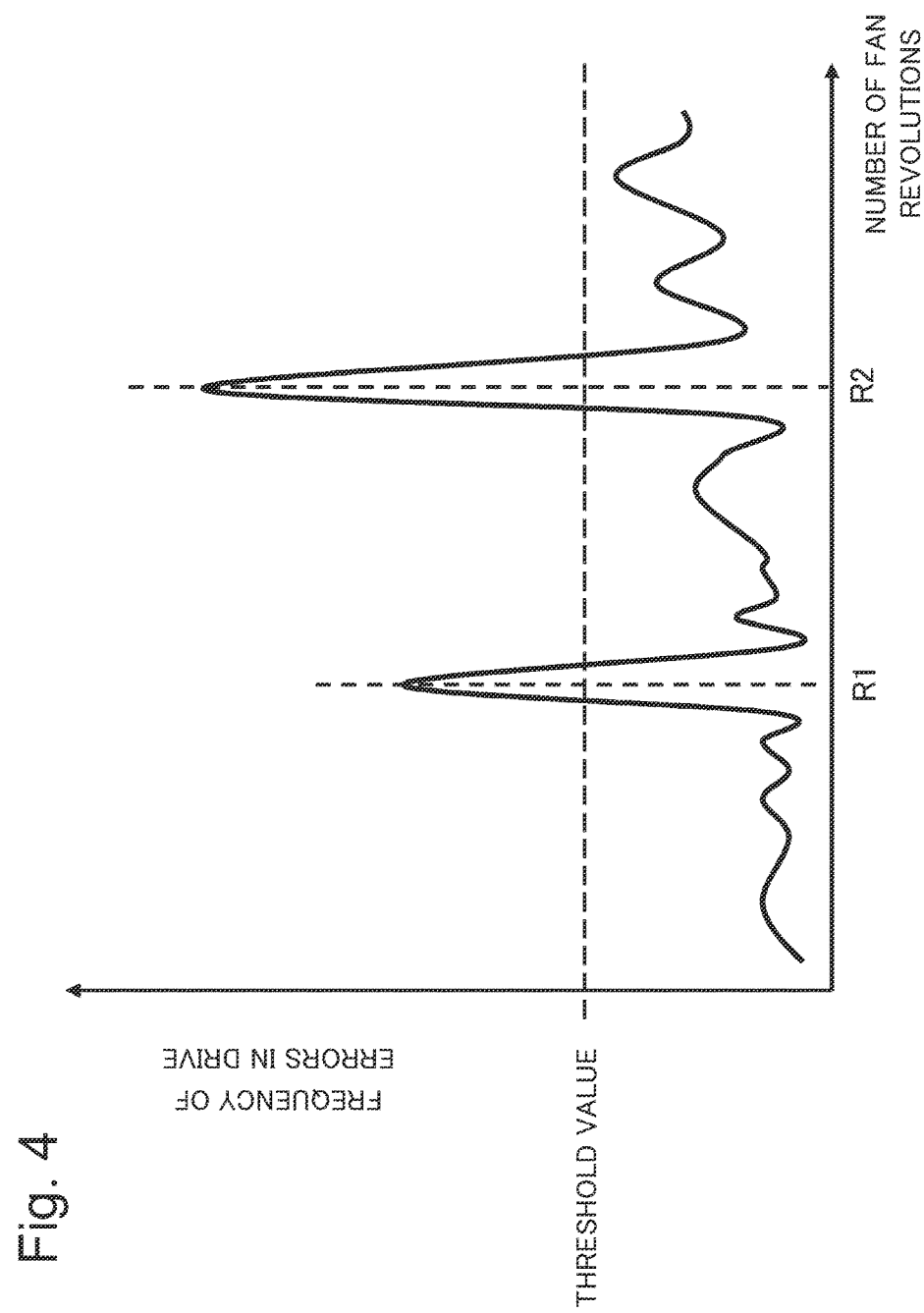
FIG. 4 is a graph illustrating an example of relationship between the number of fan revolutions and a frequency of errors.

The determination unit 29 may store, in the storage means 30, numeric information to be used as a basis for graph information representing relationship between the number of revolutions of the fan 12 and the frequency of errors in the drive 11, as illustrated in FIG. 4. The example of the graph in FIG. 4 illustrates that the frequency of errors is extremely high (exceeds the threshold value) at the numbers of fan revolutions R1 and R2, and hence each of the numbers of revolutions R1 and R2 corresponds to the number of revolutions to avoid. Further, in practice, the frequency of errors is also high in the number of revolutions around the number of revolutions to avoid compared to that in other numbers of fan revolutions. For this reason, a band of numbers of revolutions in which the number of fan revolutions exceeds the threshold value may be set as a band of numbers of revolutions to avoid for a peak having the number of revolutions to avoid as the top. In the following, the number of fan revolutions and a band of the numbers of fan revolutions are sometimes referred to as a number (band of numbers) of fan revolutions together.

In recording of a value in the storage means 30, it is important to collect, as the numbers of revolutions to avoid, only the numbers of fan revolutions resulting to be prominent by resonance, and hence a method of using deviation as the reference is conceivable.

For example, the determination unit 29 calculates an average and a standard deviation of frequencies of errors at each number (band of numbers) of fan revolutions, and thereby obtains a deviation value of frequencies of errors at each number (band of numbers) of fan revolutions. Then, the determination unit 29 registers, in a database, the number (band of numbers) of fan revolutions having a deviation value of 70 or higher, for example. Provided that the statistics follow a normal distribution, the number (band of numbers) of fan revolutions to be stored in the storage means 30 corresponds to 0.275% of the total, in the case of using 70 as the deviation value. Further, the deviation value used as the threshold value of the number of errors is not limited to 70, and can be set to any arbitrary value. In addition, the method of determining the number (band of numbers) of fan revolutions to be stored in the storage means 30 is not limited to the method described above.

(Fan Revolution Number Controlling Means)

Figure 5:
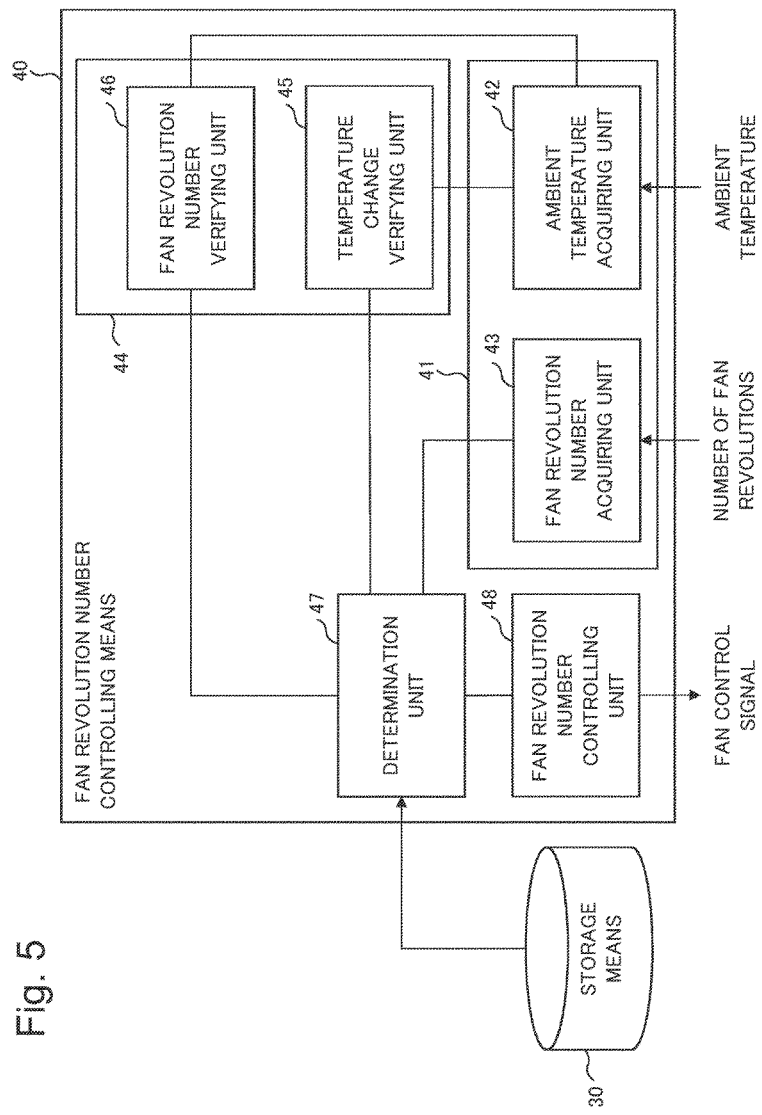
FIG. 5 is a functional block diagram of fan revolution number controlling means of the management control system according to the embodiment of the present invention.

As illustrated in FIG. 5, the fan revolution number controlling means 40 includes a revolution-number/temperature acquiring unit 41, a verification unit 44, a determination unit 47, and a fan revolution number controlling unit 48. The fan revolution number controlling means 40 is revolution number controlling means for controlling the number of fan revolutions.

The revolution-number/temperature acquiring unit 41 is revolution-number/temperature acquiring means for acquiring the current number of revolutions of the fan 12 and ambient temperature of the space to be cooled by the fan 12. The revolution-number/temperature acquiring unit 41 includes an ambient temperature acquiring unit 42 and a fan revolution number acquiring unit 43 as illustrated in FIG. 5. The ambient temperature acquiring unit 42 and the fan revolution number acquiring unit 43 are implemented by a device including a data input/output function and a communication function, for example.

The ambient temperature acquiring unit 42 acquires current ambient temperature measured by the temperature sensor 14. The ambient temperature acquiring unit 42 outputs the acquired ambient temperature to a fan revolution number verifying unit 46 and a temperature change verifying unit 45. Further, provided that the temperature sensor 14 measures surface temperature or internal temperature of the drive 11, the ambient temperature acquiring unit 42 may be configured to acquire the surface temperature or the internal temperature of the drive 11.

The fan revolution number acquiring unit 43 acquires the current number of revolutions of the fan 12. The fan revolution number acquiring unit 43 outputs the acquired number of fan revolutions to the determination unit 47.

The verification unit 44 is verification means for verifying the number of fan revolutions optimal for the current ambient temperature (the optimal number of fan revolutions) and verifying information on change in ambient temperature. The verification unit 44 includes the temperature change verifying unit 45 and the fan revolution number verifying unit 46. The temperature change verifying unit 45 and the fan revolution number verifying unit 46 are implemented by an arithmetic function of the CPU, for example.

The temperature change verifying unit 45 compares ambient temperature obtained by measurement at this time with ambient temperature obtained by measurement at the prior time, to thereby verify information on change in ambient temperature in response to a request from the determination unit 47. Alternatively, the temperature change verifying unit 45 may compare ambient temperature acquired at predetermined timing or ambient temperature set in advance, with ambient temperature obtained by measurement at this time. The temperature change verifying unit 45 outputs, to the determination unit 47, the information on change in ambient temperature, in response to a request from the determination unit 47.

For example, when the ambient temperature at this time is higher than that at the prior time, it is better for the temperature change verifying unit 45 to record the information on change in ambient temperature as flag information. In this case, the fan revolution number verifying unit 46 only needs to increase the number of fan revolutions based on a flag set by the temperature change verifying unit 45.

The fan revolution number verifying unit 46 verifies the number of fan revolutions optimal for the acquired ambient temperature (the "optimal number of fan revolutions" or the "optimal number of revolutions") based on the ambient temperature acquired from the ambient temperature acquiring unit 42. The fan revolution number verifying unit 46 outputs the determined optimal number of fan revolutions to the determination unit 47.

For example, the fan revolution number verifying unit 46 can use a formula bringing a calculation result leading to the control of increasing the number of fan revolutions when the ambient temperature is higher than a temperature threshold value, while leading to the control of decreasing the number of fan revolutions when the ambient temperature is lower than the temperature threshold value. Alternatively, the fan revolution number verifying unit 46 may store, for example, in storage means such as a read only memory (ROM), the optimal number of fan revolutions corresponding to the ambient temperature in the form of table or the like, and determine the optimal number of fan revolutions by referring to the table.

The determination unit 47 is determination means for determining whether or not the number of revolutions to avoid which is equal to the optimal number of fan revolutions calculated by the fan revolution number verifying unit 46 is stored in the storage means 30. In other words, the determination unit 47 verifies whether or not the number of revolutions to avoid which is equal to the optimal number of revolutions is stored in the storage means 30. When the number of revolutions to avoid is stored in the storage means 30, the determination unit 47 outputs information for controlling the number of fan revolutions to the fan revolution number controlling unit 48.

When the number of revolutions to avoid which is equal to the optimal number of fan revolutions is not stored in the storage means 30, the determination unit 47 instructs the fan revolution number controlling unit 48 to set the number of fan revolutions to the optimal number of fan revolutions.

On the other hand, when the number of revolutions to avoid which is equal to the optimal number of fan revolutions is stored in the storage means 30, the determination unit 47 requests information on change in ambient temperature from the temperature change verifying unit 45. Then, by referring to the information on change in ambient temperature acquired from the temperature change verifying unit 45, the determination unit 47 issues an instruction to the fan revolution number controlling unit 48.

When the ambient temperature increases, the determination unit 47 instructs the fan revolution number controlling unit 48 to control to increase the number of fan revolutions to be larger than the optimal number of fan revolutions. Moreover, when the ambient temperature does not increase, the determination unit 47 instructs the fan revolution number controlling unit 48 to maintain the current number of fan revolutions.

The fan revolution number controlling unit 48 is fan revolution number controlling means for transmitting, to the fan 12, a fan control signal for controlling the number of revolutions of the fan 12 depending on the instruction from the determination unit 47. The fan revolution number controlling unit 48 is implemented by a program for controlling the number of fan revolutions depending on temperature information by using an arithmetic function and a control function of the CPU, for example.

Description has been given above of the configuration of the server system according to the embodiment of the present invention. The above-described configuration is only an example, and is not intended to limit the scope of the present invention. Any configuration obtained by making various changes and additions to the above-described configuration is also within the scope of the present invention.

(Operations)

Next, with reference to the flowcharts in FIG. 6 and FIG. 7, operations of the management control system 10 according to the embodiment of the present invention will be described. In the following, description will be given of a process of calculating the number of fan revolutions causing a high frequency of errors (FIG. 6) and a process of controlling the number of fan revolutions (FIG. 7) separately.

(Calculation Process)

Figure 6:
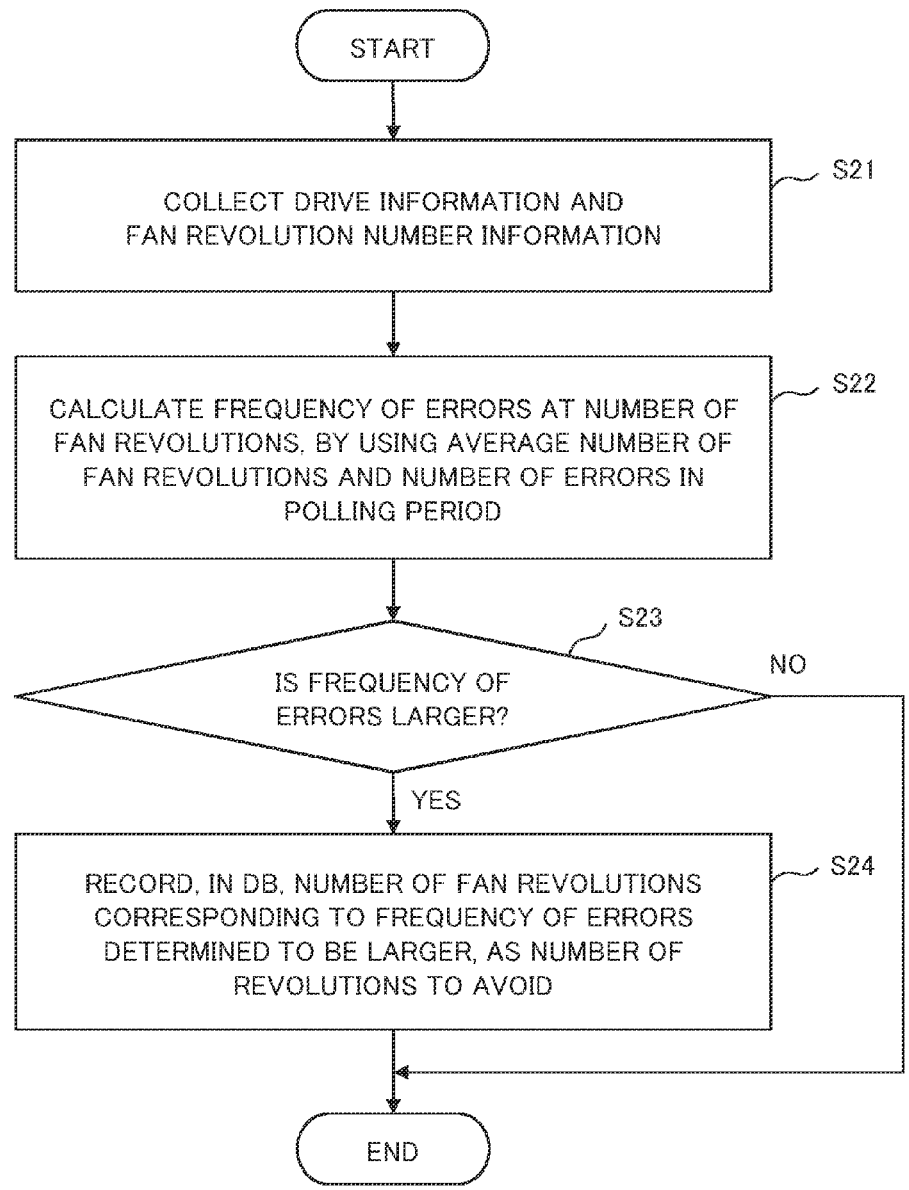
FIG. 6 is a flowchart illustrating an operation of the error frequency calculating means of the management control system according to the embodiment of the present invention.

FIG. 6 is a flowchart illustrating an operation of the error frequency calculating means 20 of the management control system 10 according to the embodiment of the present invention. FIG. 6 illustrates a calculation process carried out by the error frequency calculating means 20 illustrated in FIG. 3.

In FIG. 6, first, the revolution-number/drive-information acquiring unit 21 of the error frequency calculating means 20 acquires drive information of a specific drive 11, and also acquires fan revolution number information of the fan 12 for cooling the specific drive 11 (Step S21).

In a process in Step S21, the drive information acquiring unit 22 acquires drive information of the drive 11, and the fan revolution number acquiring unit 23 acquires fan revolution number information of the fan 12. The timing at which the drive information and the fan revolution number information are acquired is determined by the timing controlling unit 24.

Then, the calculation unit 25 counts the number of errors occurring in the drive 11, and calculates the average number of revolutions of the fan 12 in a polling period, thereby calculating a frequency of errors indicating the number of errors occurring per unit time at the average number of fan revolutions (Step S22).

In a process in Step S22, the error number counting unit 26 counts the number of errors occurring in the drive 11, and the average fan-revolution-number calculating unit 27 calculates the average number of revolutions of the fan 12 in the polling period. Further, in the process in Step S22, the error frequency calculating unit 28 calculates a frequency of errors indicating the number of errors occurring per unit time at the average number of fan revolutions.

Then, the determination unit 29 determines whether or not the frequency of errors calculated by the calculation unit 25 is larger than a preset threshold value (Step S23).

When the frequency of errors is larger than the preset threshold value (Yes in Step S23), the determination unit 29 stores, in the storage means 30, the number of fan revolutions (the average number of fan revolutions) at which the frequency of errors is determined to be larger than the preset threshold value, as the number of revolutions to avoid (Step S24). When the frequency of errors is smaller than or equal to the preset threshold value (No in Step S23), the flow in FIG. 6 is terminated.

The above is description of the calculation process by the error frequency calculating means 20.

Next, description will be given of a control process by the fan revolution number controlling means 40.

(Control Process)

Figure 7:
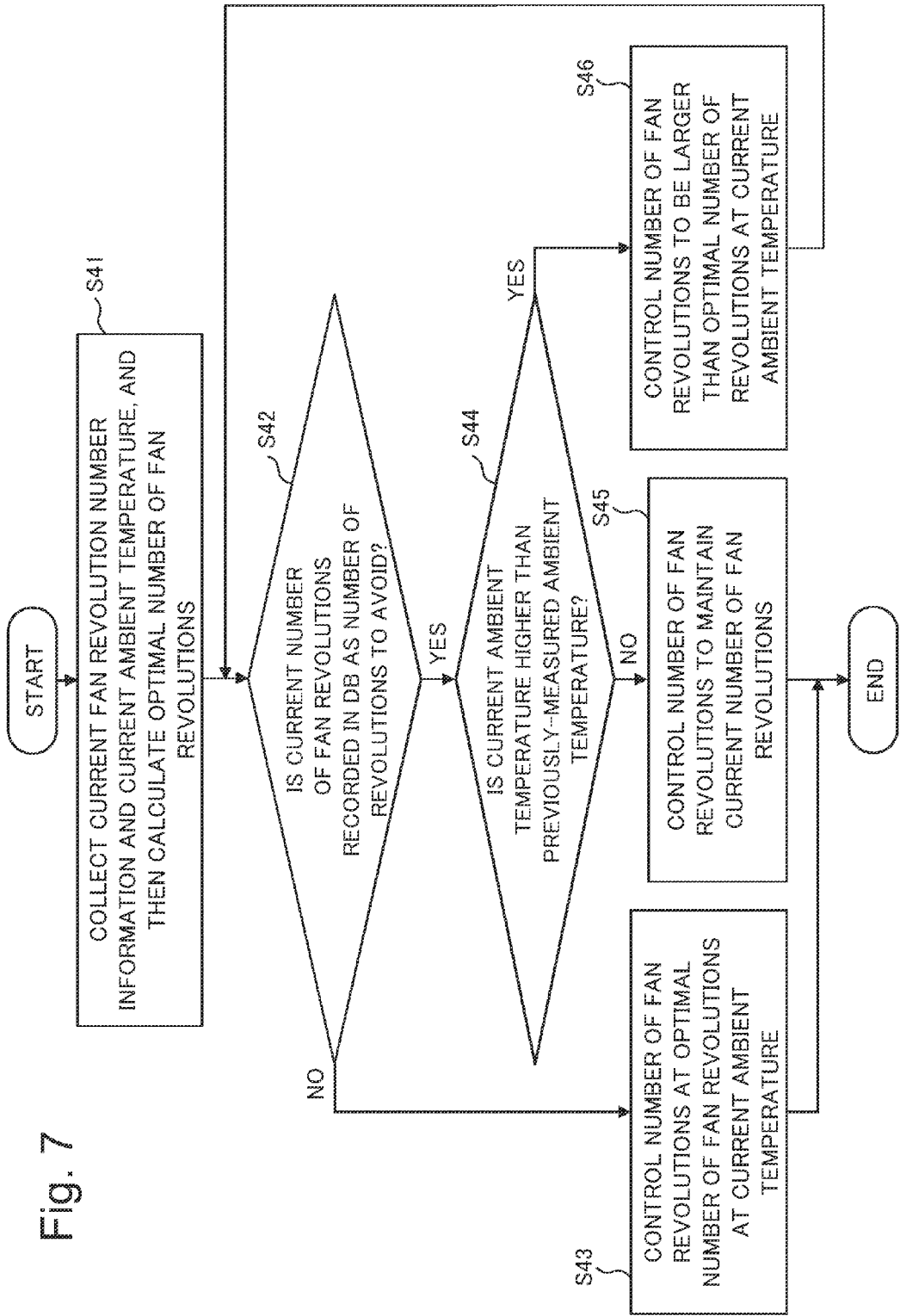
FIG. 7 is a flowchart illustrating an operation of the fan revolution number controlling means of the management control system according to the embodiment of the present invention.

FIG. 7 is a flowchart illustrating an operation of the fan revolution number controlling means 40 of the management control system 10 according to the embodiment of the present invention. FIG. 7 illustrates the control process carried out by the fan revolution number controlling means 40 illustrated in FIG. 5.

First, in FIG. 7, the revolution-number/temperature acquiring unit 41 acquires the current number of revolutions of the fan 12 and ambient temperature around a component to be cooled by the fan 12, and then calculates the optimal number of fan revolutions at the acquired ambient temperature (Step S41).

In Step S41, the ambient temperature acquiring unit 42 acquires the ambient temperature, and the fan revolution number acquiring unit 43 acquires the number of revolutions of the fan 12. Then, the fan revolution number verifying unit 46 verifies the optimal number of fan revolutions.

Then, the determination unit 47 checks whether or not the current number of fan revolutions is stored as the number of fan revolutions causing a high frequency of errors (the number of revolutions to avoid), in the storage means 30 (Step S42).

When the current number of fan revolutions is not stored as the number of revolutions to avoid in storage means 30 (No in Step S42), the determination unit 47 instructs the fan revolution number controlling unit 48 to control the fan 12 at the optimal number of fan revolutions at the current ambient temperature. In other words, the fan revolution number controlling unit 48 controls the fan 12 to be at the optimal number of fan revolutions at the current ambient temperature acquired from the fan revolution number verifying unit 46 (Step S43). The flow in FIG. 7 is terminated in Step S43.

Moreover, when the current number of fan revolutions is stored as the number of revolutions to avoid in the storage means 30 (Yes in Step S42), the determination unit 47 acquires information on change in ambient temperature from the temperature change verifying unit 45. Then, the determination unit 47 checks whether or not the current ambient temperature is higher than that obtained at the prior measurement (Step S44).

When the current ambient temperature is lower than the that obtained at the prior measurement (No in Step S44), the determination unit 47 instructs the fan revolution number controlling unit 48 to keep on controlling the fan 12 at the current number of fan revolutions. In other words, the fan revolution number controlling unit 48 controls the fan 12 to maintain the current number of fan revolutions (Step S45). When the current ambient temperature is equal to that obtained at the prior measurement, the number of fan revolutions does not need to be changed. The flow in FIG. 7 is terminated in Step S45.

When the current ambient temperature is higher than that obtained at the prior measurement (Yes in Step S44), the determination unit 47 instructs the fan revolution number controlling unit 48 to increase the number of fan revolutions to be larger than the optimal number of fan revolutions at the current ambient temperature. In other words, the fan revolution number controlling unit 48 controls the fan 12 to increase the number of revolutions of the fan 12 to be larger than the optimal number of fan revolutions at the current ambient temperature (Step S46).

After the control in Step S46, the process returns to Step S42. Then, in Step S42, the determination unit 47 checks whether or not the number of revolutions of the fan 12 after the change is recorded in the storage means 30.

The above is description of the control process by the fan revolution number controlling means 40.

In accordance with the management control system according to the present embodiment above, it is possible to prevent an error from occurring in the drive by controlling, using information stored in the database, the number of fan revolutions in order to avoid the number of fan revolutions likely to cause a high frequency of errors in the drive.

Further, the above-described management control method, which includes the calculation process and the control process, in the management control system according to the present embodiment is only an example, and is not intended to limit the scope of the present invention. Any process obtained by making various changes and additions to each of the above-described processes is also within the scope of the present invention.

(Server System)

Figure 8:
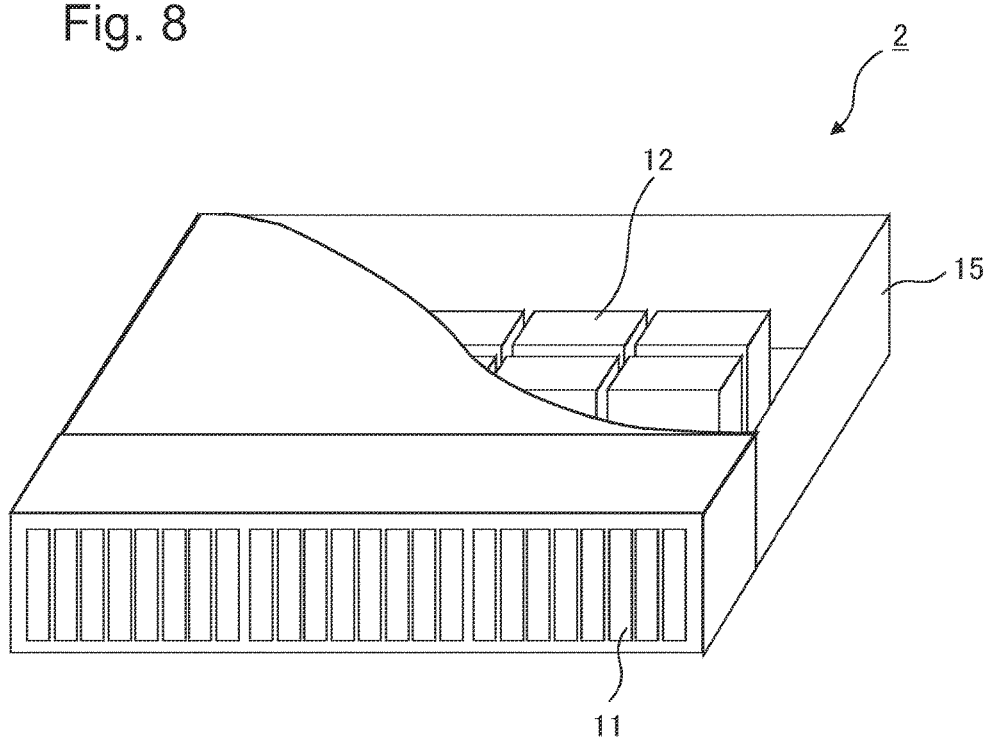
FIG. 8 is a schematic diagram illustrating a hardware configuration of the server system according to the embodiment of the present invention.

The server system 1 according to the embodiment of the present invention is implemented by a server including an HDD, a fan, and the like. FIG. 8 is a schematic diagram illustrating a server 2 including the drive 11 such as a HDD, the fan 12, and a housing 15, as an example of implementing the server system 1 according to the present embodiment. Further, in FIG. 8, an upper part of the housing is cut to let the inside be visible so that an inner configuration of the server 2 is illustrated. In addition, although the server 2 has a general configuration of a server apart from features related to the present embodiment, input/output means, communication means, and the like necessary for an actual server are omitted in FIG. 8.

The server 2 in FIG. 8 includes at least one fan 12 inside for cooling a component, in addition to components such as a CPU (not illustrated), a memory (not illustrated), and the a plurality of drives 11 such as a HDD. In addition, the server 2 also includes a service processor (not illustrated in FIG. 8) inside as the management control system 10 for the purpose of managing components provided inside. The service processor is also called a base management controller (BMC). The service processor monitors the state of each component of the server 2 point by point.

The fan 12 included in the server 2 is disposed so as to be able to control ambient temperature of the space to be cooled for the purpose of cooling the inside of the housing 15.

In the housing 15 of the server 2 with high-density arrangement of components, the drive 11 and the fan 12 may sometimes be disposed closely. Such being the case, when the number of revolutions of a disc included in the drive 11 and the number of revolutions of blades included in the fan 12 satisfy a condition for resonance, errors are likely to occur at writing/reading and the like in the drive 11.

It is possible to avoid resonance between the drive 11 and the fan 12 to some extent by disposing the drive 11 and the fan 12 as distantly as possible. However, in the server 2 including a plurality of drives 11 and the fans 12, even when the number of revolutions of either of the fans 12 is set not to satisfy a condition for resonance with a specific drive 11, it is conceivable that the fan 12 may possibly resonate with a different drive 11.

Moreover, even when the number of revolutions of the fan 12 is controlled under a condition based on a fixed natural frequency, the number of revolutions of the fan 12 may happen to be controlled to resonate more easily as the resonance condition changes with time, in consideration of the resonance condition taking into account the housing 15 and the like. Therefore, it is preferable to construct a server capable of corresponding to change of resonance condition with time point by point, by real-time drive information and fan revolution number information, as in the server system 1 according to the embodiment of the present invention.

As described above, in the present embodiment, drive information of a drive included in the server and the numbers of fan revolutions are periodically collected to identify the numbers of fan revolutions likely to cause an error in the drive, and the identified numbers of fan revolutions are stored in a database. In the embodiment of the present invention, since the fan is controlled to avoid the number of fan revolutions stored in the database, appropriate control can be provided even when the condition for resonance between the drive and the fan changes during continuous server operation. Accordingly, a failure of the drive due to vibration attributable to resonance between the fan and the drive can be suppressed, consequently reducing a failure rate of the drive and improving availability of the server system.

In general, as the number of errors in a drive increases, retry operations increase in the drive, consequently degrading processing performance. However, according to the embodiment of the present invention, the number of such errors occurring in the drive can be suppressed, thereby preventing degradation in performance of the drive.

Even when the management control method implemented by the management control system according to the embodiment of the present invention is used in a different system implemented by making changes to the configuration and operations of the management control system according to the present embodiment, such a management control method is included within the scope of the present invention. Moreover, a management control program for causing a computer to execute the management control method according to the embodiment of the present embodiment is also included within the scope of the present invention. Further, a program recording medium which records the management control program according to the embodiment of the present invention is also included within the scope of the present invention.

Next, the management control system 10 according to the embodiment of the present invention will be described specifically by using examples. In the following examples, the drive 11 is embodied in a HDD or an optical disk. Especially, the management control system 10 according to the embodiment of the present invention is suitable when a HDD is used as the drive 11. Further, even when the drive 11 is embodied in a specific example, no change needs to be made to the configuration and operations of the fan 12. Hence, in the following examples, an example with some change in the error frequency calculating means 20 (FIG. 3) and the operations in the calculation process (FIG. 6) in order to correspond to the respective drives 11 is illustrated.

Example 1

Figure 9:
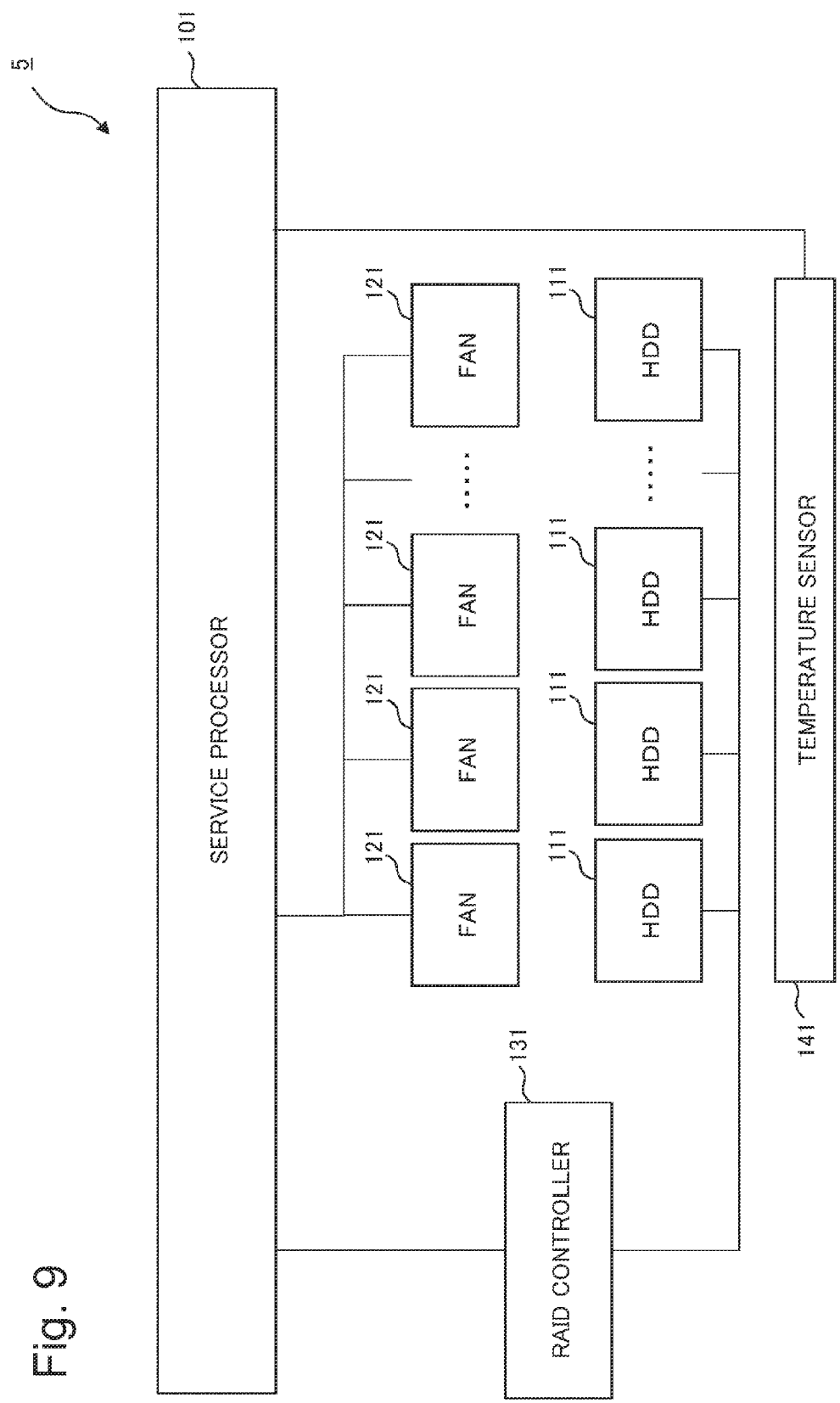
FIG. 9 is a functional block diagram of a server system of Example 1 according to the embodiment of the present invention.

FIG. 9 is a block diagram illustrating a functional configuration of a server system 5 including a service processor 101 according to Example 1. The server system 5 includes the service processor 101, at least one HDD 111, at least one fan 121, an RAID controller 131, and a temperature sensor 141.

The service processor 101 corresponds to the management control system 10. The HDD 111 corresponds to the drive 11, and the fan 121 corresponds to the fan 12. The RAID controller 131 corresponds to the drive controller 13, and the temperature sensor 141 corresponds to the temperature sensor 14. Each constituent element of the server system 5 is assumed to include a function corresponding to each constituent element of the server system 1 illustrated in FIG. 1.

The service processor 101 is connected to the fan 121 via a bus called an inter-integrated circuit (12C) or the like. In addition, the service processor 101 is connected to the HDD 111 via the RAID controller 131.

(Service Processor)

Figure 10:
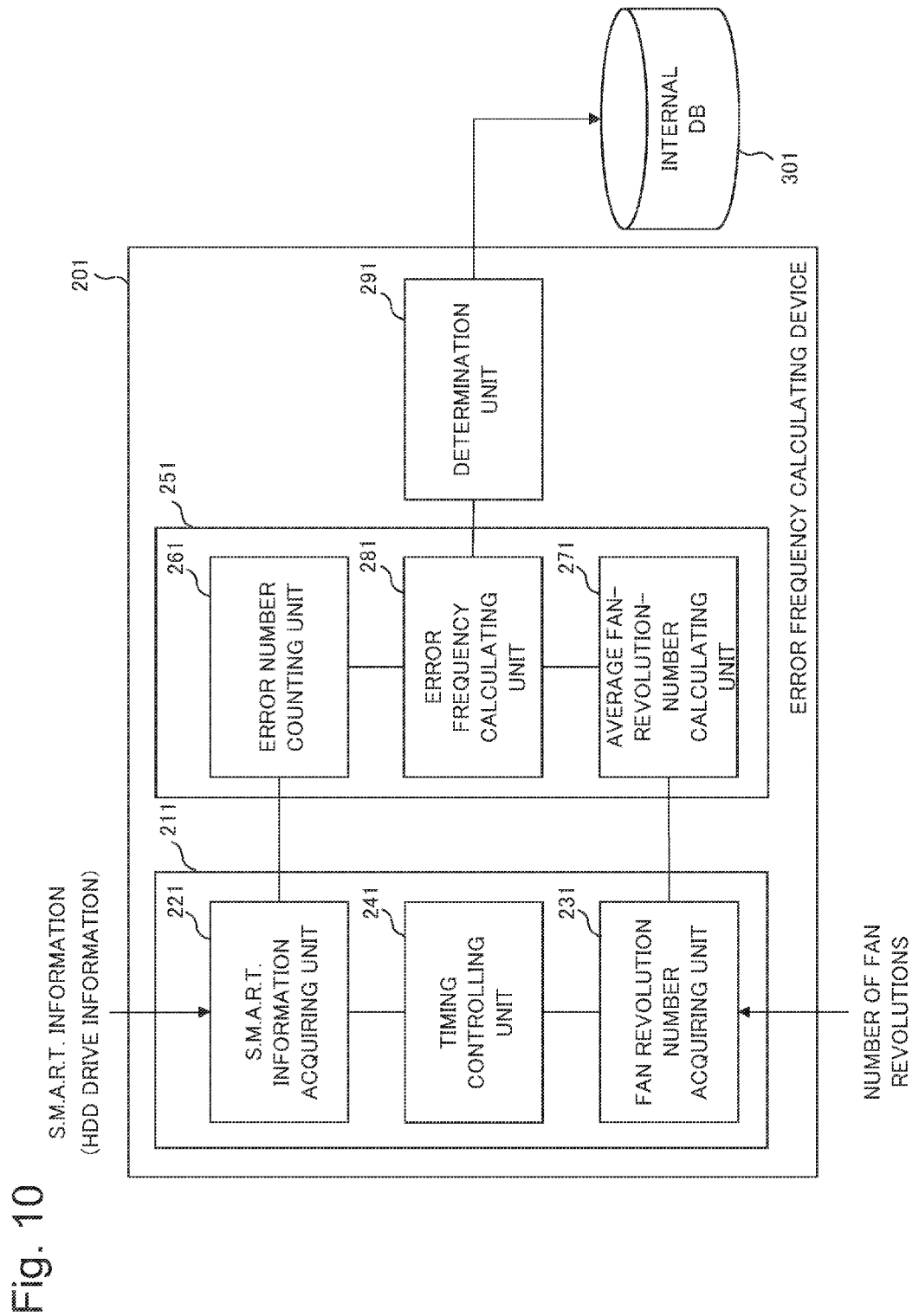
FIG. 10 is a functional block diagram of a service processor of Example 1 according to the embodiment of the present invention.

FIG. 10 is a schematic diagram illustrating a functional configuration of an error frequency calculating device 201 included in the RAID controller 131 according to Example 1. The error frequency calculating device 201 is a device implementing the error frequency calculating means 20 (FIG. 3) according to the embodiment of the present invention, and includes a configuration and functions of a general service processor.

The error frequency calculating device 201 includes a revolution-number/S.M.A.R.T.-information acquiring unit 211, a calculation unit 251, and a determination unit 291. The revolution-number/S.M.A.R.T.-information acquiring unit 211 corresponds to the revolution-number/drive-information acquiring unit 21, the calculation unit 251 corresponds to the calculation unit 25, and the determination unit 291 corresponds to the determination unit 29. The number of fan revolutions causing a high frequency of errors is stored in an internal database (DB) 301 (hereinafter referred to as an internal DB 301) as the number of revolutions to avoid.

The revolution-number/S.M.A.R.T.-information acquiring unit 211 includes S.M.A.R.T. information acquiring unit 221, a fan revolution number acquiring unit 231, and a timing controlling unit 241. The S.M.A.R.T. information acquiring unit 221 corresponds to the drive information acquiring unit 22, the fan revolution number acquiring unit 231 corresponds to the fan revolution number acquiring unit 23, and the timing controlling unit 241 corresponds to the timing controlling unit 24.

The calculation unit 251 includes an error number counting unit 261, an average fan-revolution-number calculating unit 271, and an error frequency calculating unit 281. The error number counting unit 261 corresponds to the error number counting unit 26, the average fan-revolution-number calculating unit 271 corresponds to the average fan-revolution-number calculating unit 27, and the error frequency calculating unit 281 corresponds to the error frequency calculating unit 28.

The configuration of the error frequency calculating device 201 is the same as that of the error frequency calculating means 20 in FIG. 3, in terms of constituent elements other than the S.M.A.R.T. information acquiring unit 221 and the revolution-number/S.M.A.R.T.-information acquiring unit 211. Hence, description of the configuration of those constituent elements is omitted. Moreover, operations of the S.M.A.R.T. information acquiring unit 221 and the revolution-number/S.M.A.R.T.-information acquiring unit 211 are also the same as those of the drive information acquiring unit 22 and the revolution-number/drive-information acquiring unit 21, respectively. Hence, detailed description of those operations is omitted, and only brief description will be given.

In Example 1, Seek Error Rate, Vibration During Write, and Vibration During Read are used as S.M.A.R.T. information.

The service processor 101 periodically collects S.M.A.R.T. information of the HDD 111 and fan revolution number information of the fan 121. Then, the service processor 101 calculates correlation between the number of errors and the average number of fan revolutions in a polling period, that is, a frequency of errors occurring per unit time at the number of fan revolutions.

Then, the frequency of errors is higher at the number (band of numbers) of revolutions where the HDD and the fan are resonating, than that in other number (band of numbers) of fan revolutions, and exceeds the threshold value, as illustrated in FIG. 4. Accordingly, the service processor 101 records the number (band of numbers) of fan revolutions exceeding the threshold value, in the internal DB 301 included in the service processor 101. These operations are carried out regularly, thereby accumulating data in the internal DB 301.

It is important to collect, in the internal DB 301, values resulting to be prominent by resonance, and a method using deviation as the reference can be applied, for example.

For example, an average and a standard deviation of the number (band of numbers) of fan revolutions to cause an error are calculated based on the number of errors occurring in the number (band of numbers) of fan revolutions, and thereby a deviation value for the number of errors corresponding to the number (bands of numbers) of fan revolutions is obtained. Then, the number (band of numbers) of revolutions having a deviation value of 70 or higher, for example, is stored in the internal DB 301. Provided that the statistics follow a normal distribution, the number (band of numbers) of fan revolutions to be stored in the internal DB 301 corresponds to 0.275% of the total of errors occurring.

Then, the service processor 101 accumulates the number of revolutions to avoid in the internal DB 301, and controls the fan 121 by referring to the numbers of revolutions to avoid accumulated in the internal DB 301 so that the fan 121 would not continue operating at the number of revolutions to avoid.

For example, it is possible to avoid resonance without sacrificing cooling performance of the fan 121, when the optimal number of fan revolutions is gradually increasing (in a state of temperature increase), by increasing the number of revolutions at one stroke at the time just before the number of fan revolutions reaches the number of revolutions to avoid. By contrast, when the optimal number of fan revolutions is gradually decreasing (in a state of temperature decrease), the control to maintain the current number of fan revolutions is performed in order to avoid the number of fan revolutions reaching the number of revolutions likely to cause a high frequency of errors.

In the service processor of Example 1 above, S.M.A.R.T. information of a HDD included in the server and the numbers of fan revolutions are regularly collected to identify the number of fan revolutions likely to cause an error in the HDD, and the identified number of fan revolutions is stored in a database. In the present embodiment, the fan is controlled to avoid the numbers of fan revolutions stored in the database, which makes it possible to correspond to a change of resonance condition between the HDD and the fan changing during continuous server operation. Accordingly, a failure of the HDD due to vibration attributable to resonance between the fan and the HDD can be suppressed, consequently reducing a failure rate of the HDD and improving availability of the server.

Normally, as the number of errors in an HDD increases, retry operations increase in the HDD, consequently degrading processing performance. However, in the present embodiment, the number of errors occurring in the HDD can be suppressed, thereby preventing degradation in performance of the HDD.

Example 2

Next, description will be given of Example 2, which uses an optical disk drive 112 such as a compact disc (CD) and a digital versatile disc (DVD) instead of the HDD 111 in Example 1. Configurations of both Examples 1 and 2 may be employed together.

Figure 11:
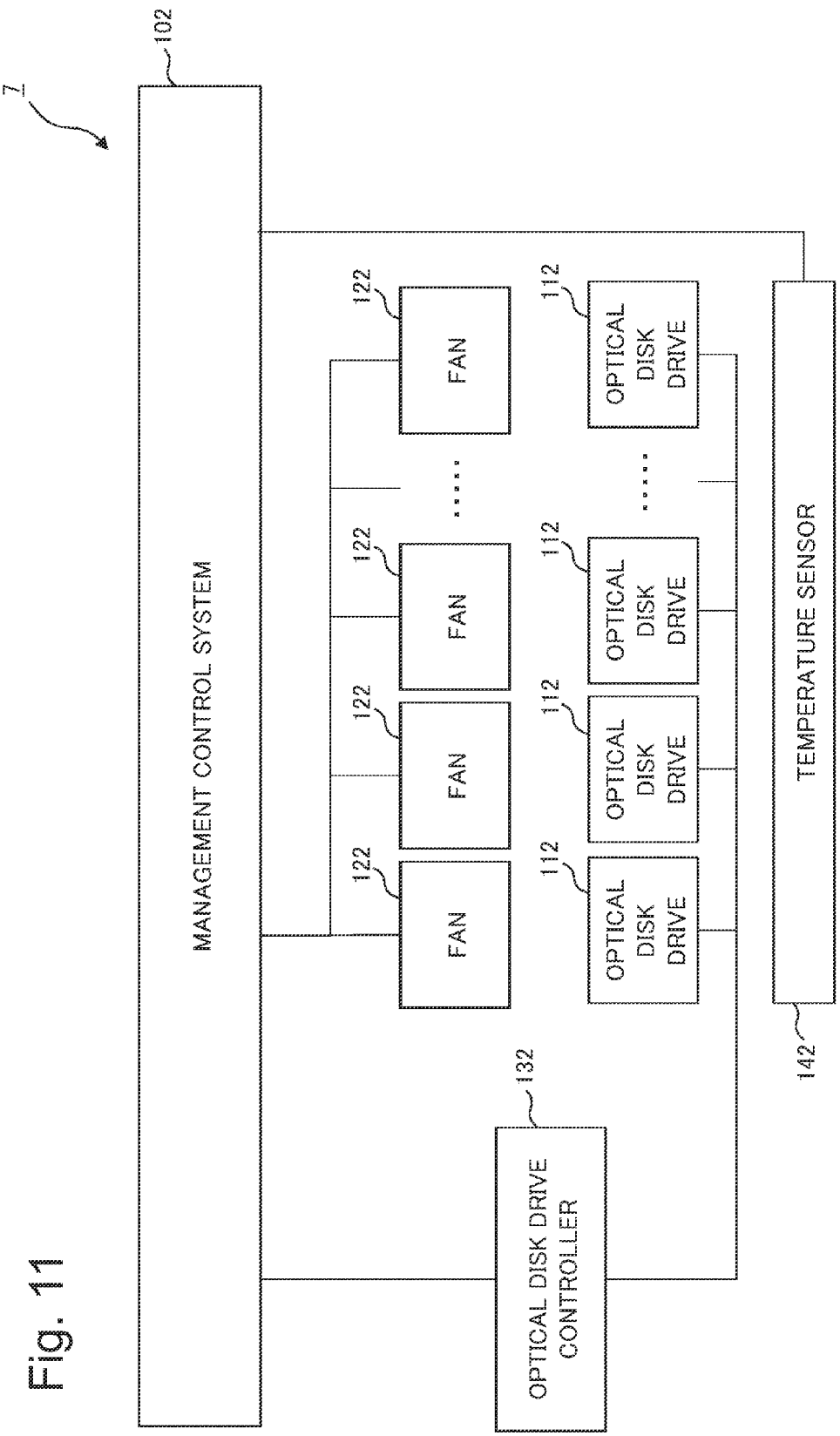
FIG. 11 is a functional block diagram of a server system of Example 2 according to the embodiment of the present invention.

FIG. 11 is a block diagram illustrating a functional configuration of a server system 7 including a management control system 102 according to Example 2. The server system 7 includes the management control system 102, at least one optical disk drive 112, at least one fan 122, an optical disk drive controller 132, and a temperature sensor 142.

The management control system 102 corresponds to the management control system 10. The optical disk drive 112 corresponds to the drive 11, and the fan 122 corresponds to the fan 12. The optical disk drive controller 132 corresponds to the drive controller 13, and the temperature sensor 142 corresponds to the temperature sensor 14. It is assumed that each constituent element of the server system 7 includes a function corresponding to each constituent element of the server system 1 illustrated in FIG. 1, unless otherwise stated.

The management control system 102 is connected to the fan 122 via a bus or the like. In addition, the management control system 102 is connected to the optical disk drive 112 via the optical disk drive controller 132.

(Management Control System)

Figure 12:
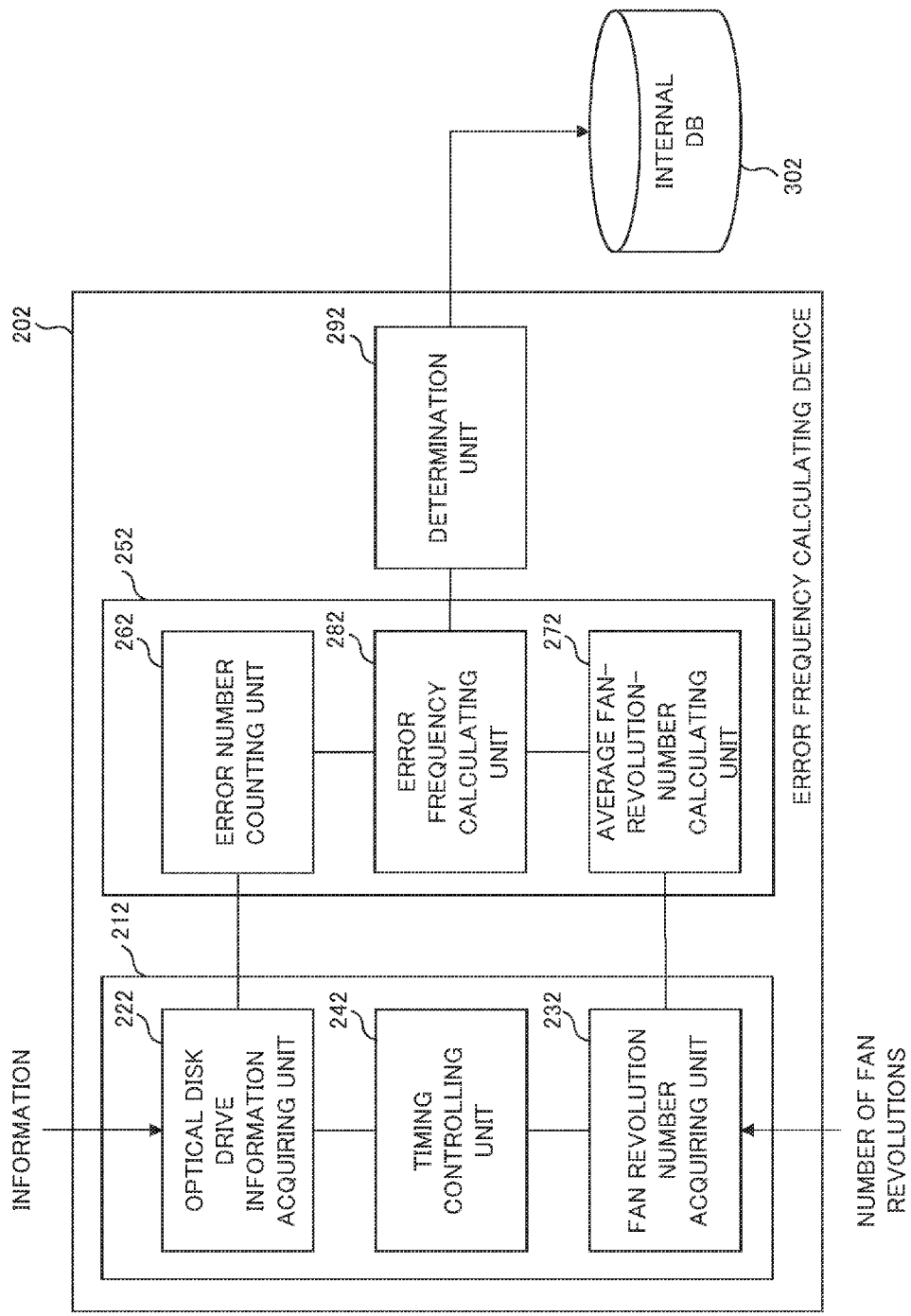
FIG. 12 is a functional block diagram of an error frequency calculating device of Example 2 according to the embodiment of the present invention.

FIG. 12 is a schematic diagram illustrating a functional configuration of an error frequency calculating device 202 included in the management control system 102 according to Example 2. The error frequency calculating device 202 is a device implementing the error frequency calculating means 20 (FIG. 3) according to the embodiment of the present invention.

The error frequency calculating device 202 includes a revolution-number/optical-disk-drive-information acquiring unit 212, a calculation unit 252, and a determination unit 292. The revolution-number/optical-disk-drive-information acquiring unit 212 corresponds to the revolution-number/drive-information acquiring unit 21, the calculation unit 252 corresponds to the calculation unit 25, and the determination unit 292 corresponds to the determination unit 29. The number of fan revolutions causing a high frequency of errors is stored in an internal database 302 (hereinafter described as an internal DB 302) as the number of revolutions to avoid.

The revolution-number/optical-disk-drive-information acquiring unit 212 includes an optical disk drive information acquiring unit 222, a fan revolution number acquiring unit 232, and a timing controlling unit 242. The optical disk drive information acquiring unit 222 corresponds to the drive information acquiring unit 22, the fan revolution number acquiring unit 232 corresponds to the fan revolution number acquiring unit 23, and the timing controlling unit 242 corresponds to the timing controlling unit 24.

The calculation unit 252 includes an error number counting unit 262, an average fan-revolution-number calculating unit 272, and an error frequency calculating unit 282. The error number counting unit 262 corresponds to the error number counting unit 26, the average fan-revolution-number calculating unit 272 corresponds to the average fan-revolution-number calculating unit 27, and the error frequency calculating unit 282 corresponds to the error frequency calculating unit 28.

A configuration of the error frequency calculating device 202 is the same as that of the error frequency calculating means 20 in FIG. 3 in terms of constituent elements other than the optical disk drive information acquiring unit 222 and the revolution-number/optical-disk-drive-information acquiring unit 212. Hence, description of those constituent elements is omitted. Moreover, operations of the optical disk drive information acquiring unit 222 and the revolution-number/optical-disk-drive-information acquiring unit 212 are also the same as those of the drive information acquiring unit 22 and the revolution-number/drive-information acquiring unit 21, respectively. Hence, detailed description of those operations is omitted, and only brief description will be given.

The management control system 102 periodically collects drive information of the optical disk drive 112 and fan revolution number information of the fan 122. Then, the management control system 102 calculates correlation between the number of errors and the average number of fan revolutions in a polling period, that is, a frequency of errors occurring per unit time at the number of fan revolutions. The management control system 102 records the calculated number of fan revolutions as the number of revolutions to avoid, in the internal DB 302 included in the management control system 102. The process of accumulating data in the internal DB 302 is the same as that in Example 1.

The management control system 102 accumulates the number of revolutions to avoid in the internal DB 302, and also controls the fan 122 by referring to the numbers of revolutions to avoid accumulated in the internal DB 302 so that the fan 122 would not continue operating at the numbers of revolutions to avoid. The method of controlling the fan 122 is the same as that in Example 1.

In Example 2 above, it is possible to reduce a failure rate of the optical disk drive included in the server and thereby improving availability of the server, and also to prevent degradation in performance of the optical disk drive.

The previous description of embodiments is provided to enable a person skilled in the art to make and use the present invention. Moreover, various modifications to these exemplary embodiments will be readily apparent to those skilled in the art, and the generic principles and specific examples defined herein may be applied to other embodiments without the use of inventive faculty. Therefore, the present invention is not intended to be limited to the exemplary embodiments described herein but is to be accorded the widest scope as defined by the limitations of the claims and equivalents.

Further, it is noted that the inventor's intent is to retain all equivalents of the claimed invention even if the claims are amended during prosecution.

The invention claimed is:

1. A management control system for managing and controlling a drive and a fan, the management control system comprising:
   error frequency calculating unit which acquires a number of errors occurring in the drive in association with a number of revolutions of the fan, calculating a frequency of errors by using the number of errors corresponding to a number of revolutions of the fan, and then calculating a number of revolutions to avoid, that is a number of revolutions of the fan to avoid, based on the calculated frequency of errors;
   storage unit which stores the number of revolutions to avoid; and
   fan revolution number controlling unit which acquires temperature of the drive or around the drive in association with a number of revolutions of the fan, and controlling a number of revolutions of the fan within a revolution number range not including the number of revolutions to avoid stored in the storage unit, depending on temperature of the drive or around the drive.

2. The management control system according to claim 1, wherein the error frequency calculating unit
   periodically acquires the number of errors occurring in the drive in a polling period in association with a number of revolutions of the fan,
   calculates the frequency of errors, that is the number of errors occurring per unit time, and also an average number of revolutions, that is an average value of a number of revolutions of the fan in the polling period, and then
   calculates, as the number of revolutions to avoid, the average number of revolutions indicating the frequency of errors exceeding a set threshold value, by associating the frequency of errors with the average number of revolutions.

3. The management control system according to claim 1, wherein the fan revolution number controlling unit,
   in a case where a current number of revolutions of the fan is within a band of numbers of revolutions to avoid including the number of revolutions to avoid,
   controls a number of revolutions of the fan to increase not to be within the band of numbers of revolutions to avoid, when current temperature of the drive or around the drive is higher than previous temperature, and
   controls a number of revolutions of the fan to maintain the current number of revolutions, when current temperature of the drive or around the drive is lower than or equal to previous temperature, and
   in a case where a current number of revolutions of the fan is not within the band of numbers of revolutions to avoid,
   controls a number of revolutions of the fan to be optimal number of revolutions at current temperature of the drive or around the drive.

4. The management control system according to claim 2 wherein
   the error frequency calculating unit includes:
   revolution-number/drive-information acquiring unit which acquires the number of errors and a number of revolutions of the fan;
   calculation unit which calculates the frequency of errors and the average number of revolutions based on the number of errors and a number of revolutions of the fan; and
   determination unit which determines, when the frequency of errors exceeds the threshold value, the average number of revolutions as the number of revolutions to avoid, by associating the frequency of errors with the average number of revolutions, and
   the fan revolution number controlling unit includes:
   revolution-number/temperature acquiring unit which acquires temperature of the drive or around the drive and a number of revolutions of the fan;

verification unit which verifies change of temperature of the drive or around the drive, and also verifying optimal number of revolutions at current temperature of the drive or around the drive;

determination unit which checks whether or not optimal number of revolutions of the fan at the current temperature is included in the storage unit, and then setting a number of revolutions of the fan depending on temperature of the drive or around the drive; and revolution number controlling unit which controls a number of revolutions of the fan depending on setting of the determination unit.

5. The management control system according to claim 4, wherein the determination unit stores, in the storage unit, a number of revolutions of the fan at which a deviation value of the frequency of errors exceeds the threshold value, as the number of revolutions to avoid.

6. The management control system according to claim 1, wherein the drive is a hard disk drive, and the error frequency calculating unit acquires the number of errors by using Seek Error Rate, Vibration During Write, and Vibration During Read among inspection items of self-monitoring, analysis and reporting technology (S.M.A.R.T.) information of the hard disk drive.

7. The management control system according to claim 1, wherein an optical disk drive is included as the drive.

8. A server system comprising:

a service processor that functions as the management control system according to claim 1;

at least one of the drive;

at least one of the fan;

a temperature sensor for acquiring temperature of the drive or around the drive; and a drive controller for controlling the drive depending on an instruction by the management control system.

9. A management control method for managing and controlling a drive and a fan, the management control method comprising:

acquiring a number of errors occurring in the drive in association with a number of revolutions of the fan, calculating a frequency of errors by using the number of errors corresponding to a number of revolutions of the fan, and calculating a number of revolutions to avoid, that is a number of revolutions of the fan to avoid, based on the calculated frequency of errors;

storing the number of revolutions to avoid in a database; and then acquiring temperature of the drive or around the drive in association with a number of revolutions of the fan, and controlling a number of revolutions of the fan within a revolution number range not including the stored number of revolutions to avoid, depending on temperature of the drive or around the drive.

10. A program recording medium recording a management control program for managing and controlling a drive and a fan, the management control program causing a computer to execute:

a process of acquiring a number of errors occurring in the drive in association with a number of revolutions of the fan, calculating a frequency of errors by using the number of errors corresponding to a number of revolutions of the fan, and then calculating a number of revolutions to avoid, that is a number of revolutions of the fan to avoid, based on the calculated frequency of errors;

a process of storing the number of revolutions to avoid in a database; and a process of acquiring temperature of the drive or around the drive in association with a number of revolutions of the fan, and controlling a number of revolutions of the fan within a revolution number range not including the stored number of revolutions to avoid, depending on temperature of the drive or around the drive.

* * * * *